Oct. 30, 1962   H. F. MINNIS   3,060,760
CHAIN TENSIONING DEVICE
Filed April 6, 1959
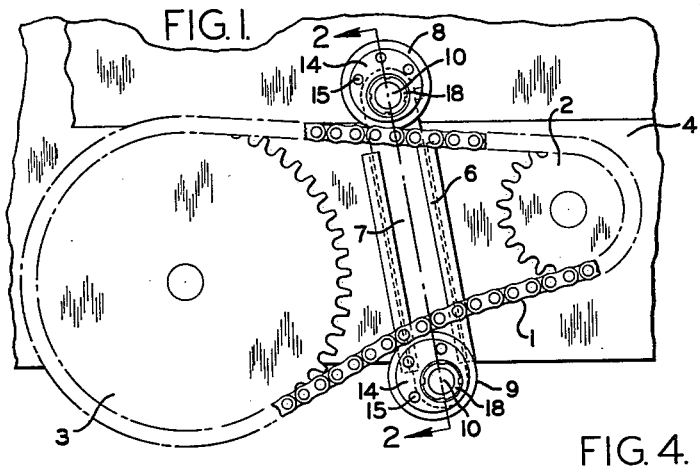
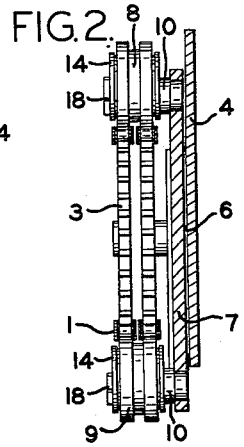
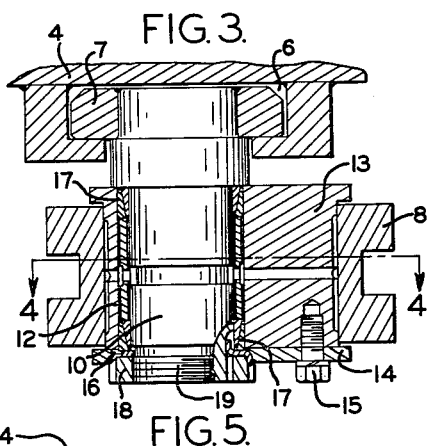
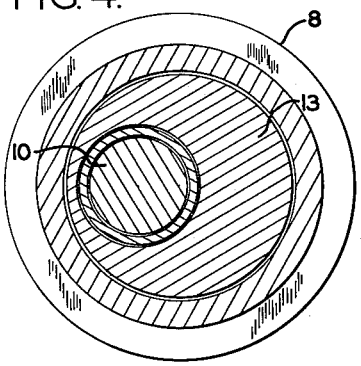
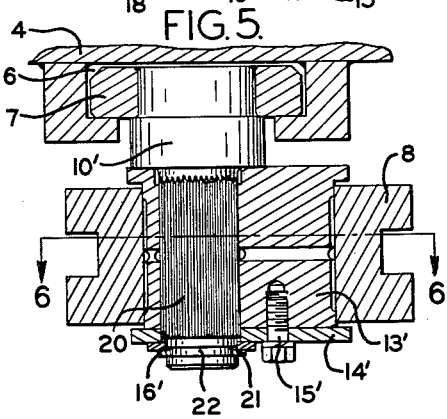
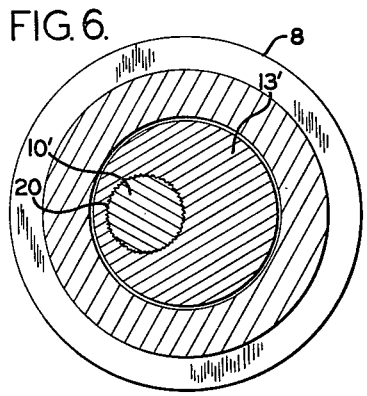
*INVENTOR:*
HAROLD F. MINNIS
BY Charles F. Osgood,
ATTORNEY.

3,060,760
CHAIN TENSIONING DEVICE
Harold F. Minnis, Claremont, N.H., assignor to Joy Manufacturing Company, Pittsburgh, Pa., a corporation of Pennsylvania
Filed Apr. 6, 1959, Ser. No. 804,471
5 Claims. (Cl. 74—242.11)

This invention relates to a chain tensioning device and more particularly to an adjustable tensioning device engaging the opposite runs at the outside of an endless reversible drive chain for maintaining the latter under proper tension.

In the use of drive chain mechanisms and particularly reversible chain drives under very heavy loads, it is desirable automatically to maintain the drive chain under proper tension, and if the chain becomes unduly slack suitable adjustable means should be provided in addition to the usual automatic tensioning means. The present invention contemplates improvements over known chain tensioning means in that a tensioning device is provided engaging both runs at the outside of a reversible drive chain whereby the taut side of the chain automatically causes the tensioning device to take up any slack thereby to maintain the proper chain tension. The tensioning device of the present invention embodies pre-set adjustable means whereby the tensioning device may be adjusted to take up undue slack in the chain.

An object of the present invention is to provide an improved chain tensioning device. Another object is to provide an improved tensioning device for a reversible endless drive chain subjected to relatively heavy loads during either direction of drive. A further object is to provide an improved chain tensioning device engaging both runs of the drive chain. A still further object is to provide an improved chain tensioning device having rotary idlers engaging both runs of the chain at the outside of the latter and having separate pre-set adjusting means for the idlers whereby any undue slack in the chain may be readily taken up. These and other objects and advantages of the invention will, however, hereinafter more fully appear in the course of the ensuing description.

In the accompanying drawing there are shown for purposes of illustration one preferred form and a modification thereof which the invention may assume in practice.

In this drawing:

FIG. 1 is a side view of an endless drive chain equipped with a chain tensioning device constructed in accordance with a preferred embodiment of the invention.

FIG. 2 is a section taken on line 2—2 of FIG. 1, showing structural details of the improved tensioning device.

FIG. 3 is a developed cross section through the shiftable tensioning bar and its guideway and an eccentric mounting for one of the rotary idlers.

FIG. 4 is a detail section taken on line 4—4 of FIG. 3.

FIG. 5 is a detail section taken on the plane of FIG. 3, showing a modified construction.

FIG. 6 is a detail section taken on line 6—6 of FIG. 5.

The reversible drive chain 1 is herein of the dual type employed in heavy duty work and is designed to bear relatively heavy loads during drive in either direction. The chain is driven by a drive sprocket 2 and passes around a larger drive sprocket 3. The drive chain and the sprockets are herein shown with their inner sides disposed in vertical planes close to a vertical wall 4 of any suitable support. Evidently in lieu of the chain and sprockets the invention may be associated with other drives such as an endless belt engaging suitable rollers or pulleys.

Now referring to the improved tensioning device it will be noted that the vertical sidewall 4 carries an upstanding guideway 6 herein desirably disposed at a small angle with respect to the vertical as shown in FIG. 1. This guideway extends in vertical planes at right angles to lines parallel with the axes of rotation of the chain sprockets 2 and 3, as shown. Slidably guided for movement along the guideway 6 is a slide bar 7 extending in vertical planes at the inner side of the drive chain between the latter and the vertical wall 4. Carried at the opposite ends of this slide bar, i.e. at the top and bottom thereof, are rotary idlers 8 and 9 respectively engaging the upper and lower runs of the drive chain at the outer side of the latter. Evidently instead of idler rolls as shown, idler sprockets may be employed, if desired. These rotary idlers are journaled on lateral horizontal shafts or pins 10 secured, as by welding, to the slide bar 7. With this improved arrangement the taut side of the reversible drive chain will always automatically cause the rotary idlers to take up the slack irrespective to the direction in which the chain is driven.

In the event undue slack in the drive chain is present it may be taken up by pre-set adjusting devices for the rotary idlers 8 and 9 and these adjusting devices are carried by the lateral shafts 10 and each comprises a bearing bushing 12 (FIG. 3) on which an eccentric 13, or an eccentrically disposed circular member or bushing, is adjustably mounted. Each rotary idler is journaled on an eccentric members as shown. A plate 14 is secured, as by a screw 15, to the outer sides of the idler, and this plate has an opening 16 through which the shaft extends, as shown in FIG. 3. Tapered multi-part expansible bushings 17 are held firmly in position by a lock nut 18 threaded at 19 on the outer portion of the shaft. The eccentric member may be readily released by loosening the lock nut and tapping the tapered bushing outwardly to enable adjustment of the eccentric relative to the shaft. Thus the location of the rotary idlers may be readily varied with respect to the slide bar at the opposite runs of the drive chain, as desired.

In the modified construction shown in FIGS. 5 and 6 the shafts or pins 10' have serrations at 20 with which complemental serrations in the bore of each eccentric member 13' cooperate for holding the eccentric members in different adjusted positions relative to the shafts. A plate 14' is secured as by a screw 15' to the eccentric member at its outer side and this plate has an opening 16' for receiving the outer portion of the shaft, as shown in FIG. 5. A split snap ring 21 is engaged in an annular groove 22 on the shaft for holding each eccentric member against outward displacement from its shaft. Otherwise this modified construction is similar to that above described.

As a result of this invention an improved tensioning device is provided which engages both runs of an endless drive chain whereby the latter may be maintained under proper tension. By the provision of the rotary idlers carried by the slide bar and engaging both runs of the reversible drive chain at the outside of the latter, the chain may be maintained under proper tension irrespective of the direction of drive. The drive chain irrespective of the direction of drive has its taut side acting on the tensioning device automatically to take up any slack so that the same is maintained under proper tension. The separate pre-set adjustable mountings for the rotary idlers enables any undue slack in the chain to be taken up readily, as desired. Other advantages of the invention will be clearly apparent to those skilled in the art.

While there are in this application specifically described one form and a modification which the invention may assume in practice, it will be understood that this form and modification of the same are shown for purposes of illustration and that the invention may be further modified and embodied in various other forms without departing from its spirit or the scope of the appended claims.

What I claim as new and desire to secure by Letters Patent is:

1. A tensioning device comprising a frame supporting a reversible driving member, a driven member spaced therefrom, a flexible looped connector extending about said members for transmitting power from said driving member to said driven member, said connector having a taut run portion and a slack run portion, idler means mounted on a support member wherein spaced portions of said idler means engage said flexible connector for maintaining tension in said run portions respectively, and guide means located on said frame for constraining said support member to unrestrictedly move in a rectilinear direction.

2. A tensioning device comprising a frame having a pair of spaced members for supporting an endless drive chain, said endless chain having a taut run portion and a slack return run portion, said spaced members having parallel axes of rotation, a slide bar slidably mounted on said frame for unrestricted guided movement in a rectilinear direction substantially perpendicular to a plane including said parallel axes, and rotary idlers carried by said slide bar wherein said idlers engage said taut run and slack run respectively for maintaining tension on said runs at all times.

3. A tensioning device as set forth in claim 2 wherein one of said spaced members is reversibly driven.

4. A tensioning device as set forth in claim 2 wherein adjustable means is provided on said slide bar for adjusting said idlers on said slide bar relative to each other.

5. A tensioning device comprising a frame supporting a reversible drive sprocket having an axis of rotation, a driven sprocket mounted on said frame having an axis of rotation spaced from said first mentioned axis and substantially parallel thereto, a flexible connector extending about said sprockets for transmitting power from said drive sprocket to said driven sprocket, said connector having a taut run portion and a slack return run portion, guide means located on said frame intermediate said sprockets, a slide member guided for unrestricted rectilinear movement by said guide means substantially perpendicular to a plane containing the axes of said sprockets, and a pair of idler members rotatably mounted on said slide member wherein the idler members engage said taut run portion and said return run portion respectively of said flexible member.

References Cited in the file of this patent

UNITED STATES PATENTS

| | | |
|---|---|---|
| 37,713 | Houten | Feb. 17, 1863 |
| 691,538 | Frigerio | Jan. 21, 1902 |
| 1,575,655 | Stinson | Mar. 9, 1926 |
| 1,582,516 | Gibson | Apr. 27, 1926 |
| 1,892,067 | McMillan | Dec. 27, 1932 |
| 2,066,721 | Eaton | Jan. 5, 1937 |
| 2,347,900 | Frazer-Nash et al. | May 2, 1944 |